United States Patent
Schack et al.

(10) Patent No.: US 7,273,134 B2
(45) Date of Patent: Sep. 25, 2007

(54) ACTUATION UNIT FOR AN ELECTROMECHANICALLY-ACTUATED DISC BRAKE

(75) Inventors: Peter Schack, Seligenstadt (DE); Paul Linhoff, Neu-Anspach (DE); Jürgen Völkel, Frankfurt (DE); Andreas Pohlmann, Eschborn (DE); Johannes Gorlach, Langgons (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 176 days.

(21) Appl. No.: 10/522,292

(22) PCT Filed: Jul. 25, 2003

(86) PCT No.: PCT/EP03/08252

§ 371 (c)(1),
(2), (4) Date: Jan. 25, 2005

(87) PCT Pub. No.: WO2004/013513

PCT Pub. Date: Feb. 12, 2004

(65) Prior Publication Data

US 2005/0247528 A1    Nov. 10, 2005

(30) Foreign Application Priority Data

Jul. 26, 2002  (DE) .............................. 102 34 335
Mar. 5, 2003   (DE) .............................. 103 09 831

(51) Int. Cl.
F16D 55/08    (2006.01)
B60T 17/22    (2006.01)

(52) U.S. Cl. .................. 188/72.8; 188/1.11 R

(58) Field of Classification Search ............... 188/72.1, 188/72.4, 72.6, 72.7, 1.11 R, 72.8
See application file for complete search history.

(56) References Cited

U.S. PATENT DOCUMENTS

| | | | |
|---|---|---|---|
| 6,325,180 B1* | 12/2001 | De Vries et al. | 188/72.1 |
| 6,405,836 B1* | 6/2002 | Rieth et al. | 188/72.1 |
| 2003/0050147 A1* | 3/2003 | Backes et al. | 475/343 |
| 2004/0163900 A1* | 8/2004 | Beuerle et al. | 188/72.1 |
| 2005/0103580 A1* | 5/2005 | Kramer | 188/71.8 |
| 2006/0102438 A1* | 5/2006 | Bayer et al. | 188/156 |

FOREIGN PATENT DOCUMENTS

| | | |
|---|---|---|
| DE | 196 29 936 C1 | 11/1997 |
| DE | 101 48 472 A1 | 4/2003 |
| EP | 432122 A2 * | 6/1991 |
| EP | 0 916 867 A2 | 5/1999 |
| WO | WO98/27357 | 6/1998 |
| WO | WO99/45292 | 9/1999 |
| WO | WO 2003020563 A1 * | 3/2003 |

* cited by examiner

Primary Examiner—Thomas Williams
(74) Attorney, Agent, or Firm—RatnerPrestia

(57) ABSTRACT

An actuating unit is provided for an electromechanically actuated disc brake for automotive vehicles, substantially comprising a driving unit or an electric motor, an actuating element by which one of two friction linings displaceably arranged within a brake caliper is brought into engagement with a brake disc, and a reduction gear. In order to determine a reaction force occurring during actuation, a sensor device for sensing the reaction force resulting from the actuating force applied by the actuating unit is provided between the guide piece and the brake caliper or a gearbox housing connected to the brake caliper, respectively.

10 Claims, 6 Drawing Sheets

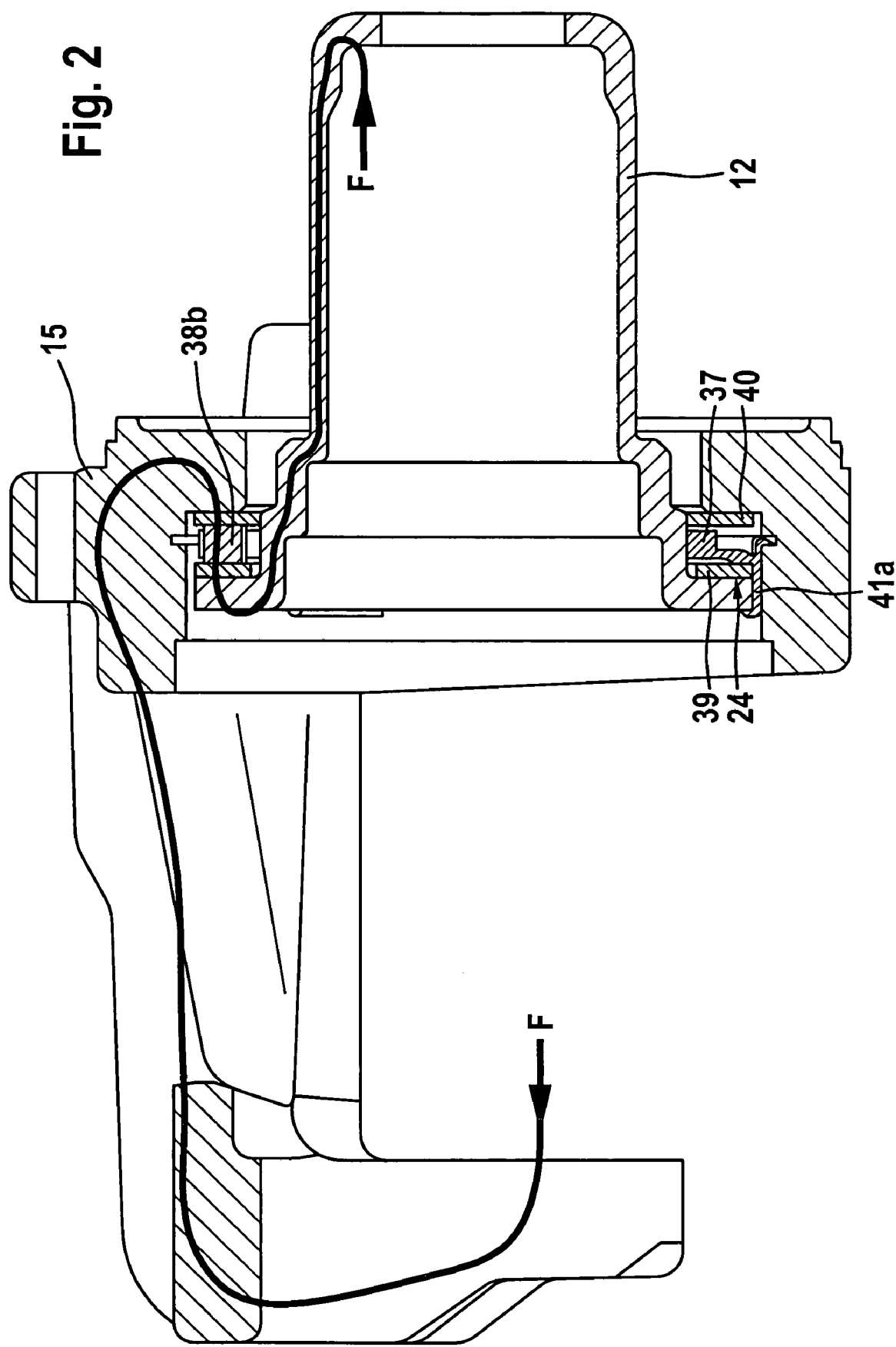

ACTUATION UNIT FOR AN ELECTROMECHANICALLY-ACTUATED DISC BRAKE

TECHNICAL FIELD

The present invention generally relates to actuating units and more particularly relates to an actuating unit for an electromechanically actuated disc brake for automotive vehicles.

BACKGROUND OF THE INVENTION

An electromechanical actuating unit of the afore-described type is disclosed in International Patent Application WO 99/45292 A1. However, the afore-mentioned publication does not reveal any details relative to the determination of the reaction force.

BRIEF SUMMARY OF THE INVENTION

It is, therefore, an object of the invention to provide an electromechanical actuating unit of the afore-described type enabling the reaction force developing during the actuation to be determined, using low-cost technical means. Another objective is to achieve a space-saving and compact design of the electromechanical actuating unit.

This object, in the practice of the invention, is achieved in that provided between the guide piece and the brake caliper or the gearbox housing connected to the brake caliper is a sensor device sensing the reaction force resulting from the actuating force applied by the actuating unit.

For more closely defining the conception of the invention, according to an advantageous development of the invention, the sensor device, on the one hand, is connected in a form-locking manner to the gearbox housing and, on the other hand, to the guide piece so as to axially secure the sensor device in position in the gearbox housing.

A preferred embodiment of the object of the invention is characterized in that the sensor device includes means for radially guiding the guide piece.

According to another embodiment of the invention, the sensor device comprises an annular holder on which three pressure-measuring elements are circumferentially distributed. The annular holder, preferably, is made of plastic material.

According to a particularly favorable embodiment of the subject matter of the invention, the pressure-measuring elements are of a square configuration, comprising strain gauge faces disposed in a plane extending in a direction normal to the admission of the reaction force.

An easily realizable and reliably operating actuation of the actuating unit of the invention, according to another feature of the invention, is achieved in that the annular holder is provided with means for contacting the strain gauge faces. The contact means comprise an injection-molded punched grid enabling electric signals to be communicated while being connected to the strain gauge faces by way of thin-wire bonds.

In a particularly compact design of the object of the invention, the annular holder is provided with an electric plug for connection to the strain gauge faces, comprising an electronic evaluating unit.

High precision of the measuring signal generated by the force sensor, according to another embodiment of the invention, is achieved in that the strain gauge faces are bridge-circuited.

In conclusion, the problem underlying the invention described in the afore-going is solved by a design wherein a spindle of the threaded drive is supported on the guide piece, with a journal bearing being interposed therebetween, in that a bearing ring of the journal bearing being designed (formed) as a component part of a sensor device which is provided for sensing the reaction force resulting from the actuating force applied by the actuating unit.

BRIEF DESCRIPTION OF THE DRAWINGS

FIGS. 2, 2*a* are highly simplified sectional views of the mounting situation of the force sensor in the actuating unit according to FIG. 1.

DETAILED DESCRIPTION OF THE PREFERRED EMBODIMENTS

Figure 1:
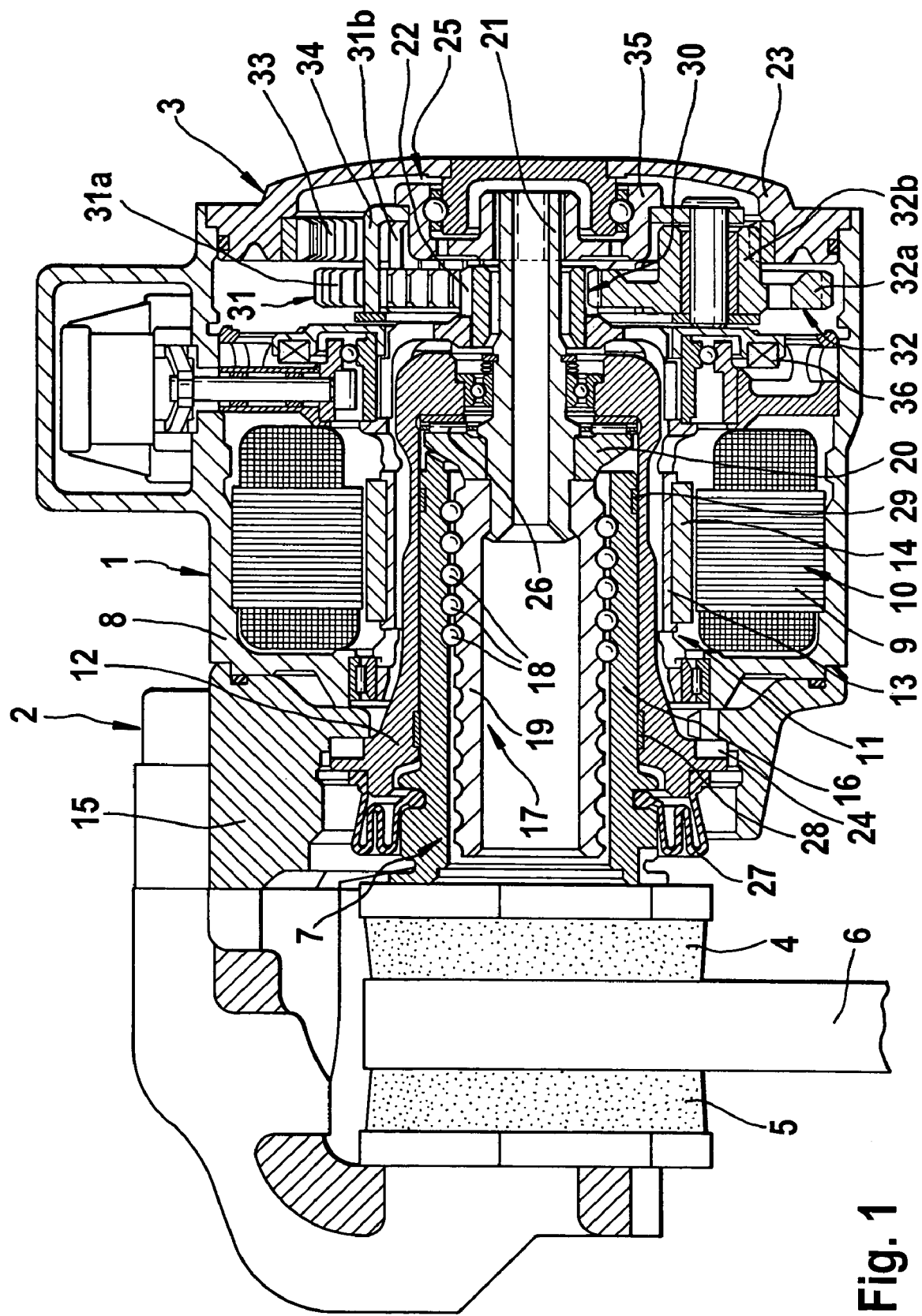
FIG. 1 is a sectional axial view of a design of the electromechanical actuating unit of the invention.

The electromechanical actuating unit of the invention as illustrated in FIG. 1 is used for actuating a floating caliper-type disc brake with the brake caliper only schematically shown being displaceably disposed within a stationary holder (not shown). A pair of friction linings 4 and 5 are so arranged in the brake caliper as to face the left-hand and right-hand side faces of a disc brake 6.

The friction lining 4 shown in the drawing to the right thereof is designated by 'first friction lining' while the other friction lining provided with reference numeral 5 is designated by 'second friction lining'. While the first friction lining 4 by means of an actuating element 7, through the actuating unit, is in direct engagement with brake disc 6, the second friction lining 5, due to the action of a reaction force applied during actuation of the assembly by the brake caliper, is urged against the opposite side face of the brake disc 6. The actuating unit of the invention arranged by means of fasteners (not shown) on the brake caliper, is of a modular design substantially consisting of three independently operable components or modules, namely of a driving unit 1, a first reduction gear 2 actuating the first friction lining 4, and a second reduction gear 3 operatively connected between the driving unit 1 and the said first reduction gear 2.

The afore-mentioned driving unit 1 is composed of an electric motor 10 designed in the embodiment as shown as an electronically commuted motor energized by a permanent magnet, the stator 9 of which is stationarily disposed in the motor frame 8 while the stator 11 thereof comprises an annular carrier 13 carrying a plurality of permanent magnet segments 14. Operatively disposed between the electric motor 10 and the afore-mentioned actuating element 7 is the first reduction gear 2 which in the example as shown is designed as a ball-type threaded drive 16-21 disposed in a gearbox housing 15 which can also be designed integrally with the afore-mentioned brake caliper. The ball-type threaded drive comprises a threaded nut 16 and a threaded spindle 17, with a plurality of balls 18 provided between the threaded nut 16 and the threaded spindle 17, rotating upon a rotary movement of the threaded spindle 17, thereby causing an axial or translatory movement of the threaded nut 16. The threaded nut 16, preferably, forms the afore-mentioned actuating element 7. The threaded spindle 17 actuated by the electric motor 10 through the second reduction gear 3, preferably, is of a tripartite design, consisting of a first tubular spindle portion 19 in engagement with the threaded nut 16 through the afore-mentioned balls 18, an annular second spindle portion 20 and a third spindle portion 21.

The arrangement preferably is such that the rotor 11 of the motor 10, by interposing the second reduction gear 3, drives the third spindle portion 21 while the threaded nut 16 is supported on the first friction lining.

A reduction of the required motor moment, in the embodiment of the invention as shown in the drawing, is achieved by a suitable integration of a planetary gear 30-34 forming the afore-mentioned reduction gear 3. The planetary gear which is operatively disposed between the rotor 11 and the threaded spindle 17 comprises a sun gear 30 preferably formed of an externally toothed area 22 formed on a rotor 11, a plurality of stepped planetary gears of which two are shown and provided with reference numerals 31 and 32, and of an internal gear 33. The stepped planetary gears 31, 32 disposed in a planetary cage 34 comprise a first step cooperating with the sun gear 33, and a second step cooperating with the internal gear 33, with the first step comprising toothed gears 31a, 32a of larger diameters and the second step comprising toothed gears 31b, 32b of smaller diameters. The afore-mentioned planetary cage 34, preferably, is so designed that the area thereof between the bearing points of the planetary gears 31, 32 and the coupling point of the threaded spindle 17 permits both a small axial and radial clearance and a minor angular displacement; it is formed, for example, as a laminated disc or a bellow. The internal gear 33 comprises an internally toothed area of a lid 23 forming the housing of the planetary gear.

The afore-mentioned threaded nut 16 of the ball-type threaded drive is guided or disposed within a cup-shaped guide piece 12. The arrangement of the threaded nut 16 within the guide piece 12 is both within the area thereof facing the first friction lining 4 by means of a first slide ring 28 disposed in the guide piece 12, and within its end area facing away from the friction lining 4 by means of second slide ring 29 arranged on the threaded nut 16.

Moreover, FIG. 1 conveys that the second annular spindle portion 20 is supported on an axial bearing 26 disposed within the guide piece 12, while the third spindle portion 21, through a form-locking plug connection, is connected to the planetary cage 34 of the second reduction gear 3. To that effect, the end of the third spindle portion 21 is formed, for example, as a torx-connection or as a hexagon pushed into a conforming aperture in the planetary cage 34. Insofar it is of a special advantage for the form-locking plug connection to be coupled to the planetary cage 34 in a manner stiff against torsion, radially resilient and flexible. Coupling is through an external ring 35 of a radial bearing 25 provided in the lid 23. A flexible sealant or sealing collar clamped between the nut 16 and the guide piece 12 prevents the ingress of dirt into the interior of the ball-type threaded drive from occurring.

Moreover, it is reasonable for a trouble-free operation of the actuating unit of the invention to provide the nut 16 at the end thereof facing away from the friction lining 4 with an axial projection (not shown) which, during restoring, cooperating with a stop circumferentially formed on the second spindle portion 20. By supporting a side face of the projection on the stop the nut 16 is effectively prevented from being further restored, thereby precluding the two portions 16, 20 from being stuck.

To determine the current position of rotor 11, a position detecting system 36 (not shown in detail) is provided. The information on the position is then determined by means of a Hall sensor or a magnetically resistive element.

Finally, in order to determine the afore-mentioned reaction force F (FIG. 2) resulting from the actuating force applied by the drive unit 1, a sensor device or a force sensor 24 only schematically shown is provided between the guide piece 12 and the gearbox housing 15. The output signal generated by the force sensor 24 is communicated as an input value to an electronic controller (not shown).

Figure 2A:
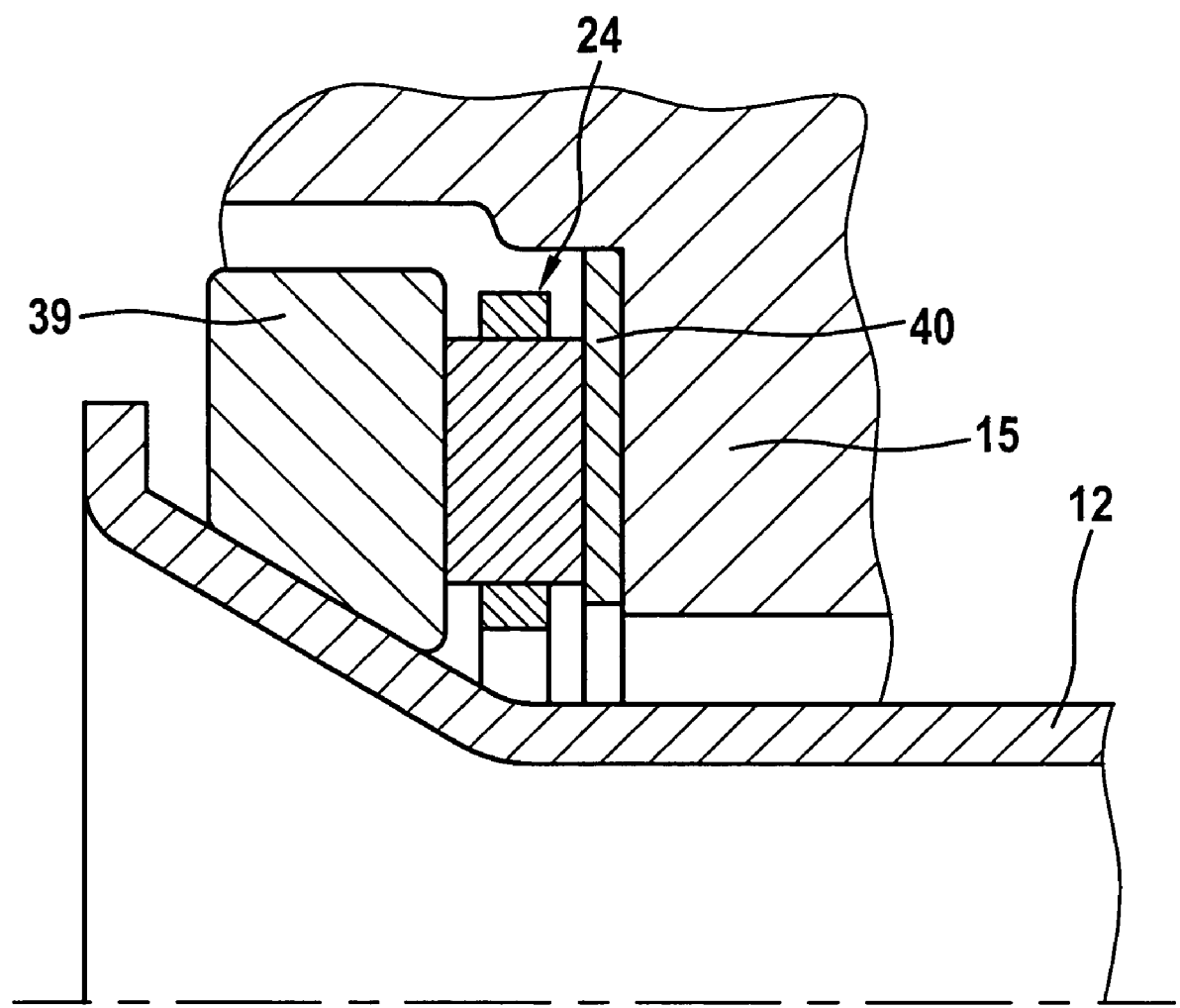
Figure 3:
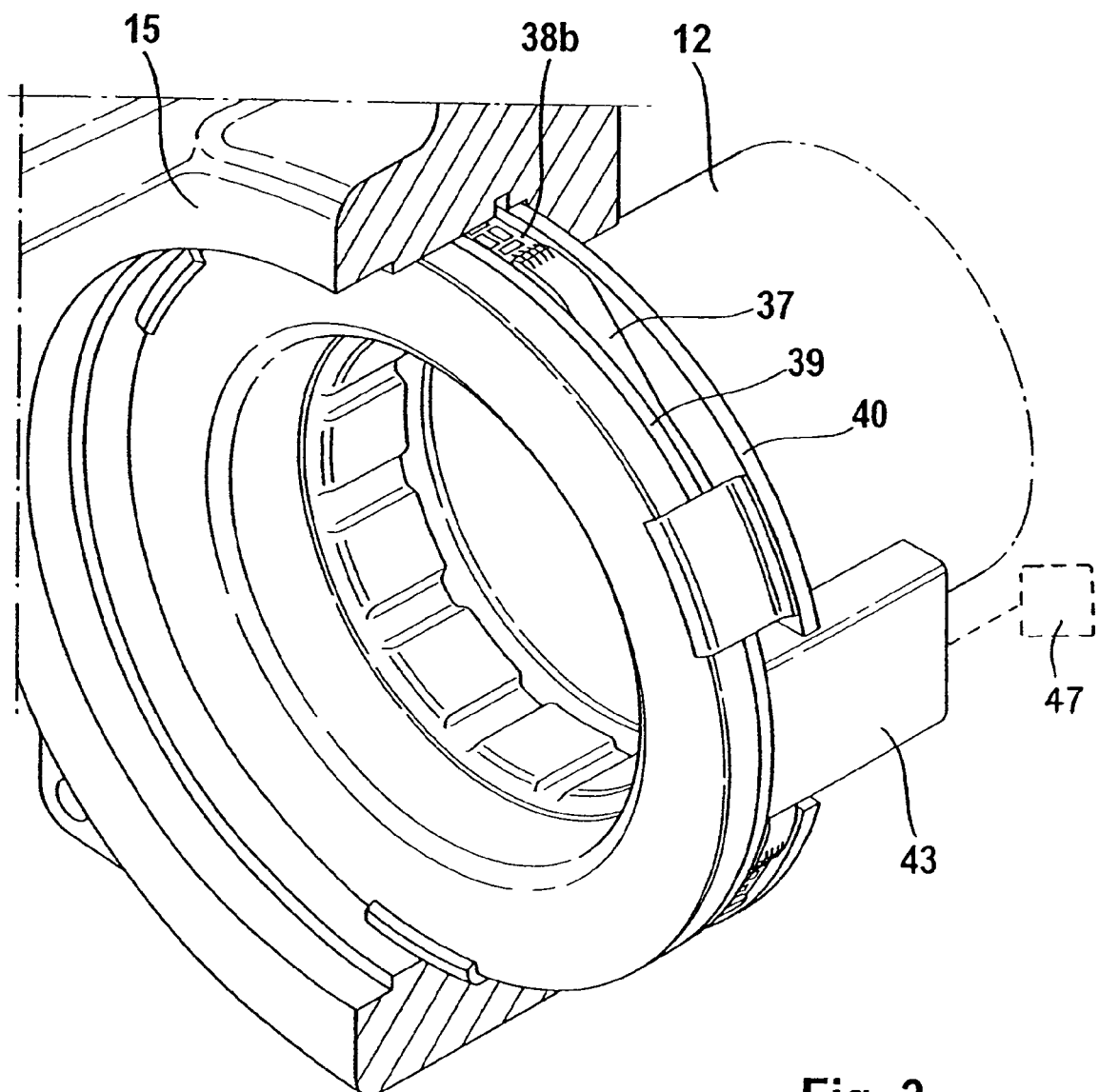
FIG. 3 is a partly sectional explosive view of the mounting situation of the force sensor.
Figure 4:
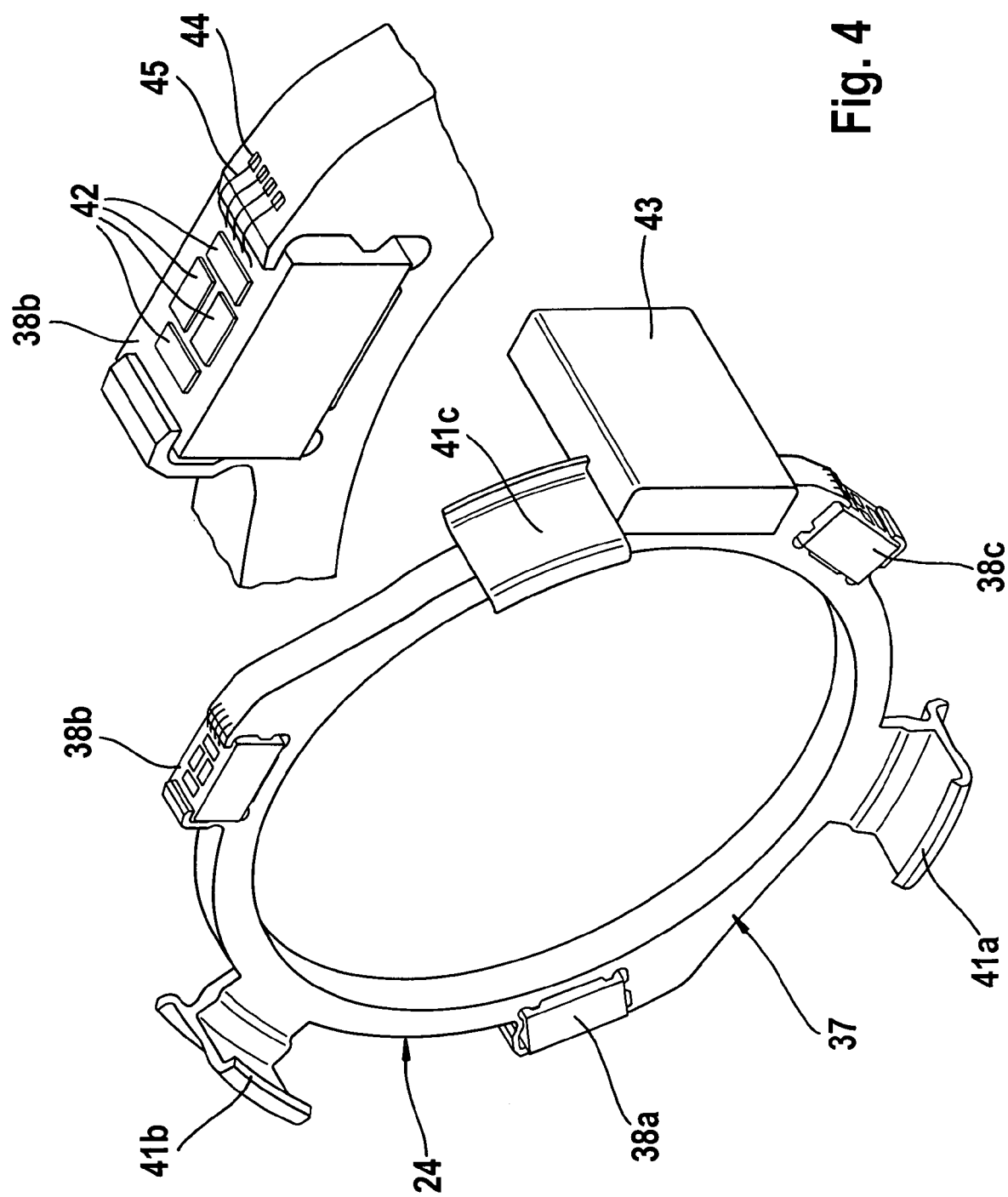
FIG. 4 is a perspective view of the force sensor.

As especially conveyed by FIGS. 2 to 4, the above-mentioned force sensor 24, preferably, comprises a holder 37 made of plastic material, and three peripherally arranged pressure-measuring elements 38a, b, c staggered by respectively 120°. In the assembled condition of the force sensor 24 shown in FIGS. 2 and 3, the said sensor is disposed between two pressure rings 39, 40 such that a radial collar or a cone face (see FIG. 2a) of the guide piece 12 is in abutment with the former mentioned pressure ring 39, whereas the latter-mentioned pressure ring 40 is axially supported on the gearbox housing 15. Moreover, holder 37 comprises locking and guiding means 41a-c injection-molded between the pressure-measuring elements, with the said locking and guiding means, on the one hand, securing a form-locking connection of the force sensor 24 to the guide portion 12 and, on the other hand, ensuring a central and fixed position within the gearbox housing 15. The pressure-measuring elements 38a-c, preferably, are of a square-type configuration, respectively comprising four strain gauge faces 42 formed on the surface of the pressure-measuring elements 38a-c in a plane extending in a direction normal to the direction of the force admission into sensor 24. To generate a high-quality sensor signal, the strain gauge faces 42 are bridge-circuited. Moreover, embedded in the plastic material of the holder 37 is a punched grid 44 serving for contacting the strain gauge faces 42 by means of thin-wire bonds 45. The electric connection of the force sensor 24 is through a plug 43 injection-molded to the holder 37 wherein an electronic analyzer 47 (shown in phantom) may be integrated.

Figure 5:
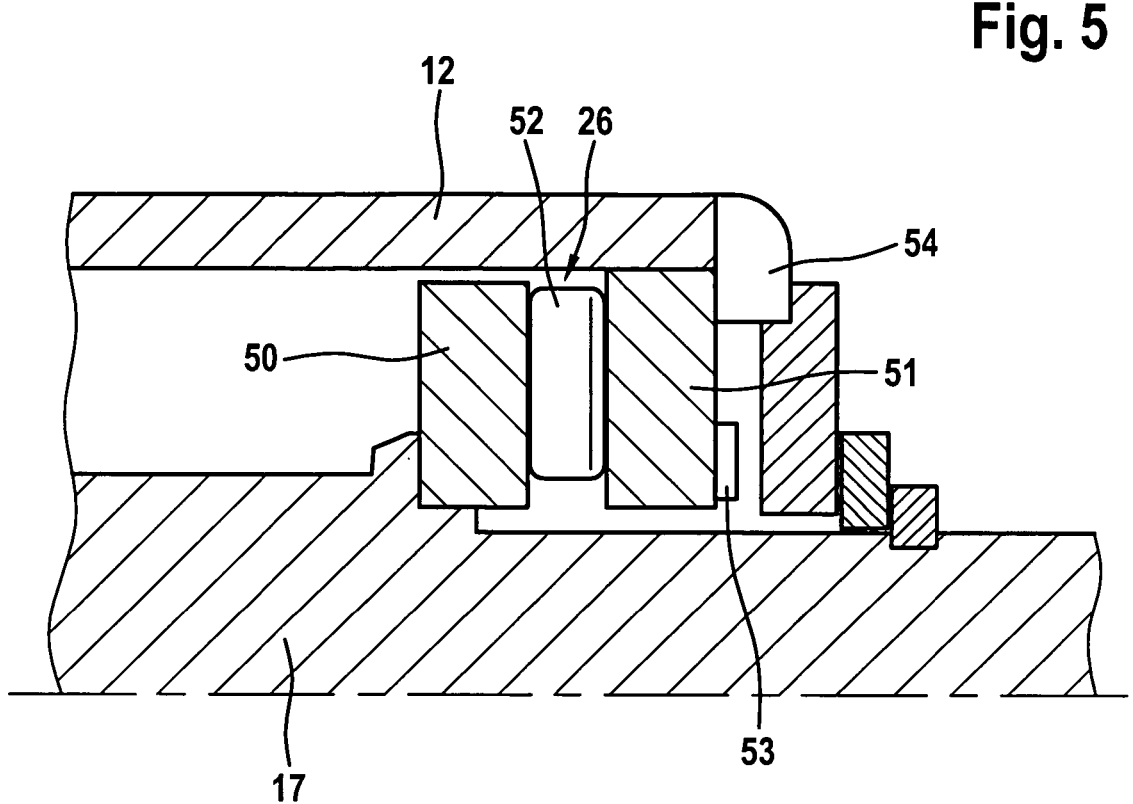
FIGS. 5, 6 are greatly simplified axial sectional views of another embodiment of the electro-mechanical actuating unit of the invention in the initial and actuated positions.
Figure 6:
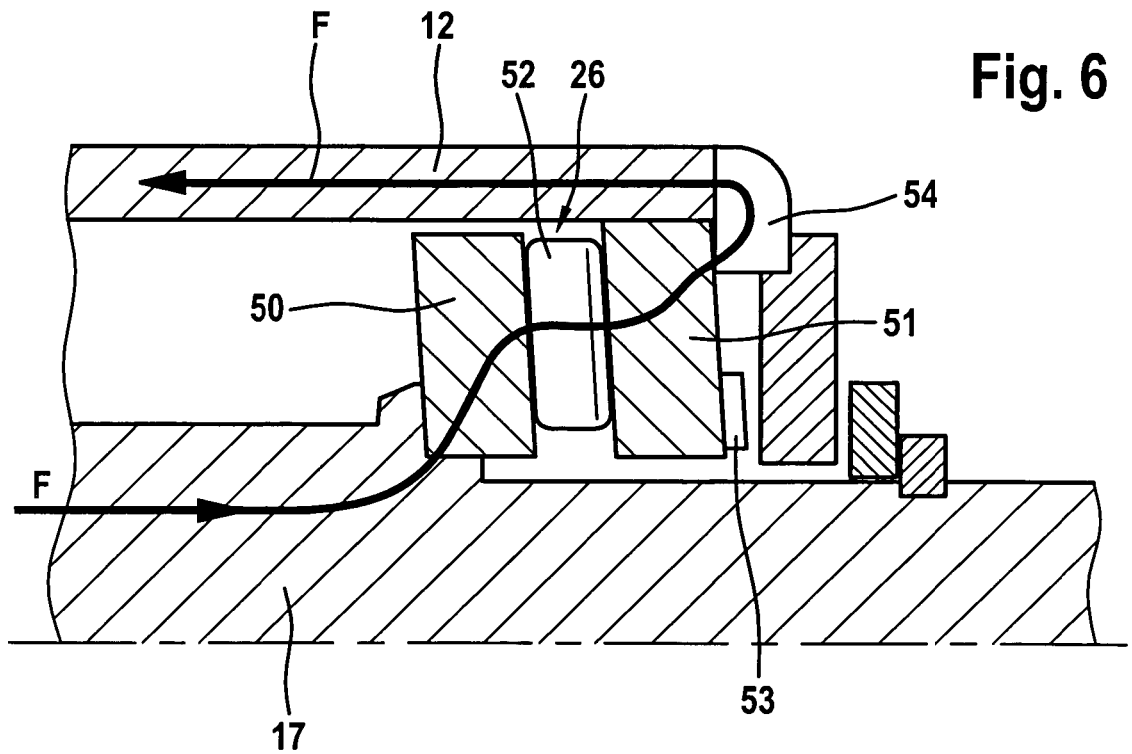

In the second embodiment of the invention as shown in FIGS. 5 and 6, the afore-mentioned sensor device 24 is disposed in the area of the axial bearing 26 within the guide piece 12. The axial bearing 26 essentially comprises a first bearing ring 50, a second bearing ring 51 supported on the guide piece 12, and roll elements 52 provided between the two bearing rings 50, 51. Disposed on the second bearing ring 51 forming a component part of the sensor device 24 is a sensor element 53 only schematically shown, determining the deformation of the second bearing ring 51 or the 'plate-type structure' thereof occurring under load (FIG. 6). Arrows F indicate the transfer of the reaction force between spindle 17 and guide piece 12 that occurs upon actuation. A recess 54 within the guide piece 12 enables the sensor element 53 to be contacted by electric conduits (not shown).

LIST OF REFERENCE NUMERALS 1 driving unit
2 reduction gear
3 reduction gear
4 friction lining
5 friction lining
6 brake disc
7 actuating element
8 motor housing 9 stator
10 electric motor
11 rotor
12 guide piece
13 carrier
14 permanent magnet segment
15 gearbox housing
16 threaded nut
17 threaded spindle
18 ball
19 spindle portion
20 spindle portion
22 area
23 lid
24 force sensor
25 radial bearing
26 axial bearing
27 sealant
28 slide ring
29 slide ring
30 sun gear
31 planetary gear
31a planetary gear
31b planetary gear
32 planetary gear
32a planetary gear
32b planetary gear
33 internal gear
34 planetary cage
35 external ring
36 position detecting system
37 holding ring
38a-c pressure-measuring element
39 pressure ring
40 pressure ring
51a-d locking and guiding means
42 strain gauge face
43 plug
44 punched grid
45 thin-wire bonds
50 bearing ring
51 bearing ring
52 roll element
53 sensor element
54 recess

The invention claimed is:

1. An actuating unit for an electromechanically actuated disc brake for use with automotive vehicles, which is disposed on a brake caliper wherein two friction linings are disposed in a manner limitedly displaceable, cooperating with respectively one side face of a brake disc, with one of the said friction linings by means of an actuating element, through the actuating unit, being movable into engagement with the brake disc directly, and the other of said friction linings being movable into engagement with the brake disc through the action of a reaction force applied by the brake caliper, wherein the actuating unit comprises an electric motor and a reduction gear operatively disposed between the electric motor and the actuating element, which reduction gear is formed of a threaded drive accommodated by a guide piece axially supported on the brake caliper or a gearbox housing connected to the brake caliper, wherein provided between the guide piece and the brake caliper or the gearbox housing connected to the brake caliper is a sensor device for sensing the reaction force resulting from the actuating force applied by the actuating unit, and wherein the sensor device is axially locked relative to the guide piece and axially locked relative to the brake caliper or the gearbox housing connected to the brake caliper, wherein the sensor device includes at least one radially extending first member configured to engage the guide piece to axially lock the sensor relative thereto and at least one radially extending second member configured to engage the brake caliper or the gearbox housing connected to the brake caliper to axially lock the sensor relative thereto.

2. An actuating unit according to claim 1, wherein the sensor device comprises means for radially guiding the guide piece.

3. An actuating unit according to claim 1, wherein the sensor device comprises an annular holder on which are circumferentially distributed three pressure-measuring elements.

4. An actuating unit according to claim 3, wherein the annular holder is made of plastic material.

5. An actuating unit according to claims 3, wherein the pressure-measuring elements are of a square-type configuration and are provided with strain gauge faces disposed in a plane extending in a direction normal to the admission of the reaction force.

6. An actuating unit according to claim 5, wherein the annular holder comprises contacting means for contacting the strain gauge faces.

7. An actuating unit according to claim 6, wherein the contacting means are formed of a punched grid injection-molded from plastic material, enabling electric signals to be communicated and being connected by thin-wire bonds to the strain gauge faces.

8. An actuating unit according to claim 3, wherein the annular holder is provided with an electric plug for connection of the strain gauge faces.

9. An actuating unit according to claim 8, wherein the electric plug comprises an electronic analyzer.

10. An actuating unit according to claim 5, wherein the strain gauge faces are bridge-circuited.

* * * * *